June 17, 1947.  E. H. R. PEGG  2,422,563
VEHICLE AIR CONDITIONING
Filed July 6, 1945
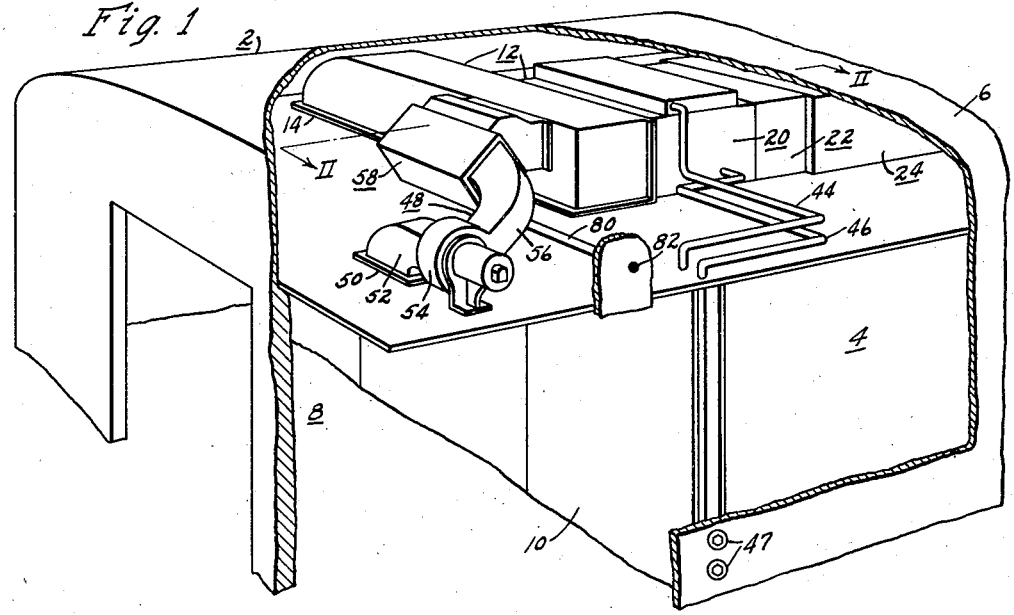
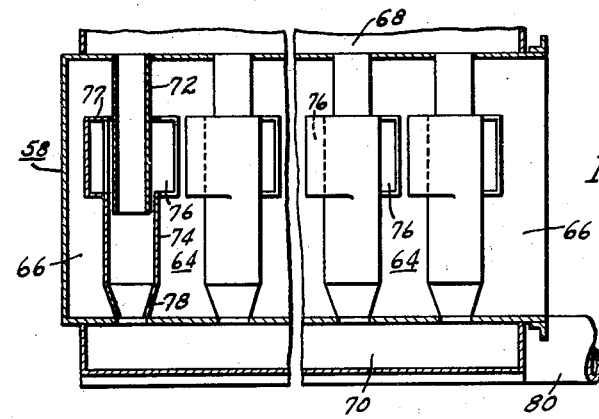
INVENTOR
Edward H. R. Pegg.
BY
B. L. Zangwill
ATTORNEY Patented June 17, 1947

2,422,563

UNITED STATES PATENT OFFICE 2,422,563

VEHICLE AIR CONDITIONING

Edward H. R. Pegg, Cranford, N. J., assignor to Westinghouse Electric Corporation, East Pittsburgh, Pa., a corporation of Pennsylvania Application July 6, 1945, Serial No. 603,511

7 Claims. (Cl. 183—7)

My invention relates to railway cars having air-conditioning systems including air-cleaning means.

My invention has for its primary object the application of satisfactory air-cleaning means in the air-conditioning system of a railroad car where the available space for receiving air-cleaning means is small or accessible with difficulty.

Typical air-conditioning systems of a passenger railroad car recirculate the air in a closed path which includes the passenger space or compartment and the air-conditioning duct of the car. To keep the air "fresh," a certain amount must be taken into the system from outside the car, an equal amount exhausting or leaking out of the car. The outside atmosphere around a railroad car has an exceptionally heavy dust loading of large dust-particles, such as, for example, cinders and road dust, which quickly clog mechanical dust-collectors and electrostatic dust-precipitators of close electrode-spacing. On the other hand, the recirculated air of the passenger car is generally contaminated with extremely fine dust-particles, such as those of tobacco smoke. An object of my invention is to provide an air-cleaning system for a railroad car, which is of minimum size but of high efficiency for removing substantially all of the dust-particles in a range between such large and fine dust-particles, and beyond, so that extremely clean air is always available in the passenger space while the system is in operation.

Many other objects, features, innovations, and combinations of my invention, in addition to the foregoing, will be discernible or obtainable from the following description and accompanying drawing of a preferred embodiment. In the drawing:

Figure 1 is a perspective view of a part of a railroad car including an air-conditioning system, for illustrating the principles of my invention.

Fig. 2 is a vertical sectional view substantially on the line II—II of Fig. 1.

Fig. 3 is a sectional view on the line III—III of Fig. 2.

A conventional railroad car is indicated in its entirety by the reference numeral 2, and comprises a passenger space or compartment 4, a roof zone 6, and one or more end vestibules 8 open to the atmosphere surrounding the car. The passenger compartment 4 has walls, including windows, on all its sides, and is separated from the vestibule 8 by a wall 10 having a customary door.

The roof zone 6 contains an air-conditioning duct 12 provided with an internal intake 14 open to the passenger compartment 4, and one or more outlets 16 also open to the passenger compartment so that air may be recirculated in a closed path confined to the passenger compartment 4 and the air-conditioning duct 12. The intake 14 is generally readily accessible and may be provided, if desired, with a very coarse mechanical filter of the mesh type or with a screen for catching lint, pieces of paper or other similar large dust-particles that can be carried by air.

Successively upstream in the direction of air-flow, between the air intake 14 and the air outlets 16, the air-conditioning duct 12 includes a plenum air-mixing chamber 18, an electrostatic dust-precipitator 20 for cleaning the air passing through the air-conditioning duct, a treating means 22 for otherwise air-conditioning the air, including its temperature and humidity, and a main blower 24.

The electrostatic dust-precipitator 20 comprises an upstream dust-charging means 26 and a downstream dust-precipitating means 28, each comprising oppositely charged electrodes. The dust-charging means 26 comprises elongated insulated ionizing wires 30, of less than 32 mils diameter, parallel to and between uninsulated round-rod non-discharging electrodes 32 which are spaced laterally across the duct 20; and the dust-precipitating means 28 comprises a plurality of upstanding alternatively insulated and uninsulated plate-electrodes 34 and 36, respectively, paralleling the gas-flow. The plate-electrodes are kept spaced and relatively insulated by a plurality of individual small spacers 38 distributed across their faces, as more fully described and claimed in the Penney Patent No. 2,347,709, dated May 2, 1944. Plate spacings for electrostatic dust-precipitators for effectively cleaning air to be recirculated with high efficiencies are usually from about 1/16 of an inch to about 3/8 of an inch.

The dust or dirt which is precipitated onto the plate-electrodes may be removed in any suitable manner by any suitable means, as represented by a chamber 40 above the plate-electrodes 34 and 36, through which a liquid delivered to it is discharged into the spaces between the plate-electrodes for cleaning them. The bottom of the electrical dust-precipitator 20 is sloped to a trough 42 for receiving spent dirty liquid. An inlet delivery pipe 44 and a liquid return pipe 46 connect respectively to the chamber 40 and the trough 42. The pipes 44 and 46 extend downwardly to any conveniently accessible location on the outside of the railroad car, such as openings 47, and terminate in matable detachable connectors normally closed by caps. When it is desired to clean the electrostatic dust-precipitator, such caps are removed and a liquid supply hose connected to the delivery pipe 44 through which liquid for washing or flushing the plate-electrodes is supplied. A return hose is connected to the detachable connector of the return pipe 46 for collecting the spent liquid. A dirt-removing or precipitator-cleaning system of this kind is mentioned in my patent No. 2,359,-149, dated September 26, 1944. However, other cleaning systems can be used, as, for example, those disclosed in the copending applications, Serial Numbers 603,503, 603,504, and 603,508, filed concurrently herewith.

In the operation of the system thus far described, the main blower 24 causes air from the chamber 18 to pass through the electrostatic dust-precipitator 20 and the treating means 22 for conditioning. The conditioned air is delivered into the compartment 4 through the outlets 16 in any satisfactory manner. Air from this compartment is drawn back into the air-conditioning duct 12 through the intake 14, passing into the chamber 18 for repassage or recirculation through the duct 12. Preferably the air is delivered to the passenger compartment 4 at a pressure which will cause air to leak outwardly from the car.

The leakage air is made up by fresh air supplied to the chamber 18 through a branch conduit system, indicated in its entirety by the reference numeral 48, comprising an external intake 50 at the end of an intake conduit 52 which leads to the low pressure side of a complementary blower 54, the discharge end or high pressure side of which is connected by a conduit 56 to the inlet side of a mechanical air-cleaner 58 that discharges into the chamber 18. The intake conduit 52 may be located in any convenient place where it may receive outside atmospheric air around the railroad car. The ceiling of the vestibule 8 is a preferred location for the intake 50.

The mechanical air-cleaner 58 is of the concentric tube type, without moving parts, and operates on the principle of removing dust-particles from air by centrifugal action. Such cleaners will effectively remove the relatively larger dust-particles, and even smaller particles of a size as low as five microns. As more particularly shown in Figs. 2 and 3, the mechanical air-cleaner comprises a plurality of sloped parallel air-cleaning sets 64 of concentric tubes, an intermediate inlet chamber 66, an upper chamber 68 for cleaned air, and a lower dust-receiving portion or chamber 70.

Each air-cleaning set 64 comprises an inner tube 72 and an outer tube 74. The inner tube 72 extends upwardly beyond the outer tube 74 that, in turn, extends below the inner tube. At a point where the two tubes are nested, the outer tube 74 is provided with diametrically opposed tangential openings 76 which are exposed in the inlet chamber 66, and with an upper somewhat annular closing wall 77 extending to the inner tube 72. The lower end of the outer tube 74 is provided with an inverted frusto-conical spout 78 opening into the dust-receiving chamber 70. The inner tube 72 passes through the inlet chamber 66 and has its upper open end in the upper chamber 68.

Air blown by the complementary blower 54 is delivered to the inlet chamber 66 of the mechanical air-cleaner, from where different portions pass through the openings 76 of the air-cleaning sets 64. The air entering the openings 76 whirls downwardly along the inner surfaces of the outer tubes 74, reverses its axial direction of flow and then whirls upwardly into and through the inner tubes 72 to the upper chamber 68. In passing through the air-cleaning sets 64, the relatively larger dust-particles are separated from the fresh air, fall by gravity and are carried to the bottom of the sets which open into the dust-receiving chamber 70 from which an exhaust pipe 80 extends to an opening 82 in an outside wall of the car. A small amount of scavenging air flows through this exhaust pipe, carrying with it the dirt which separated from the fresh air passing through the mechanical air-cleaner. The discharging of this scavenging air directly into the atmosphere eliminates the need for a closed dust-collecting compartment in the mechanical air-cleaner. This is an important feature in a system of the type described, since such a dust-collecting bin would require additional space on the railroad car.

It is necessary to place the mechanical air-cleaner on the high pressure side of the complementary blower 54 in order to obtain this flow of scavenging air that removes the dirt from the mechanical air-cleaner 58 substantially as quickly as it is separated from the incoming fresh air. The blower 54 complements the main blower 24 for maintaining a plenum system in the mixing chamber 18, but the blower 54 should not be so strong as to tend to drive air from the mixing chamber through the intake 14.

The amount of scavenging air flowing through the exhaust pipe 80 may be controlled in any suitable manner as, for example, by a restriction in this pipe which may be in the form of a valve at the opening 82.

Clean fresh air in the chamber 68 of the mechanical air-cleaner 58 is delivered to the air-mixing chamber 18 where the clean fresh air is mixed with recirculating air drawn into the chamber 18 through the internal intake 14. The mixed air passes through the various air-conditioning means in the air-conditioning duct 12 and then discharges into the passenger compartment 4.

For illustrating a typical air-conditioning system in accordance with my invention, approximately 25% outside air and 75% recirculating air may pass through air-conditioning duct 12. The complementary blower forces the fresh air into the system. This blower also supplies the air for scavenging the dirt from the mechanical air-cleaner, this scavenging air being about 5% of the cleaned fresh air supplied to the main plenum chamber 18. The part of the air, blown by the blower 54, which is used for scavenging can remain constant with varying proportions between the fresh and return air passing through the air-conditioning duct 12. It should be understood, however, that the foregoing figures are illustrative and not necessarily limitations.

The self-cleaning mechanical air-cleaner 58 and the complementary blower 54 assure a constant supply of fresh air without disturbing the pressure balances in the system because the pressure drop in the air-cleaner is substantially constant. Because the electrostatic dust-precipitator is called upon to remove only the fine and extremely fine dust-particles from the air supplied to the passenger compartment 4, its size can be restricted.

While I have described my invention in a preferred form, it is obvious that its teachings are of general application, and that these teachings can be incorporated in other forms and embodiments.

I claim as my invention:

1. An air-conditioning system applied to a railroad car having a passenger compartment, said system comprising, in combination, an air-conditioning duct inside the car having blower means and an intake and an outlet opening exposed in said passenger compartment, said air-conditioning duct including an upstream mixing chamber followed by a downstream electrostatic dust-precipitator and a blower, said electrostatic dust-precipitator comprising a dust-charging means and a dust-precipitating means including a plurality of relatively closely spaced upstanding plates, branch conduit means inside the car for supplying outside atmospheric air to said mixing chamber, said outside air constituting a minor part of the air flowing in the duct, said branch conduit means comprising an intake passage in a wall of said railroad car for outside atmospheric air, an upstream blower, a mechanical air-cleaner having a plurality of sets of upstanding concentric tubes for centrifugally cleaning the air flowing in said branch conduit system, each set comprising an inner tube and an outer tube, with the ends of the inner tube above those of the outer tube, an air-delivering duct extending from the top of said inner tube to said mixing chamber, a chamber receiving the lower ends of said outer tubes, and a scavenging pipe extending from the last said chamber to an opening in a side wall of the railroad car whereby the mechanically removed dirt is continually discharged into the surrounding atmosphere.

2. The invention of claim 1 but characterized further by plate-cleaning means for delivering cleaning liquid to the top of said upstanding plates and for removing spent liquid passing out of said plates, the plate-cleaning means comprising a liquid delivery pipe and a return pipe extending between said electrostatic dust-precipitator and an outer wall of said railroad car.

3. In a railroad car, in combination, a walled compartment to be supplied with conditioned air, the compartment being such that air can leak out of it, means for circulating air in a closed path including said compartment, said means comprising a conduit including an electrostatic dust-precipitator and a blower; a branch conduit connected to said conduit for adding fresh air to the air being circulated, the last said branch conduit comprising a mechanical air-cleaner; means for removing dirt from said mechanical air-cleaner substantially as soon as it is separated from the fresh air and for delivering the dirt to a point outside of said compartment; and pipe means with detachable connector-means for receiving a cleaning liquid from outside the compartment for delivery to said electrostatic dust-precipitator for cleaning it, and for substantially thereafter returning spent liquid to the outside of the compartment.

4. In a railroad car, in combination for a walled compartment to be supplied with conditioned air, the compartment being such that air can leak out of it, means for circulating air in a closed path including said compartment, said means comprising a conduit means including an electrostatic dust-precipitator and a blower; and means comprising a branch conduit connected to said conduit means for adding fresh air to the air being circulated, the last said means having associated therewith a separate air-moving means and a mechanical air-cleaning mechanism, and means for removing dirt from the mechanical air-cleaning mechanism substantially as soon as it is separated from the fresh air.

5. An air-conditioning system applied to a railroad car having a passenger compartment, said system comprising, in combination, an air-conditioning duct having blower means and an intake and an outlet opening exposed in said passenger compartment, said air-conditioning duct including an upstream mixing chamber for receiving air from said intake, said mixing chamber being followed by a downstream electrostatic dust-precipitator and a blower, a branch conduit means connected to said duct for supplying outside atmospheric air to said mixing chamber, with the outside air constituting a minor part of the air for said duct, said branch conduit means comprising an intake passage for outside atmospheric air, an upstream blower, a centrifugal mechanical air-cleaner, and means for delivering cleaned air from said mechanical air cleaner to said mixing chamber, and a scavenging pipe for carrying dirt away from the mechanical air-cleaner substantially as soon as it is removed from said cleaned air by said mechanical air-cleaner.

6. An air-conditioning system in a railroad car having a passenger compartment, said system comprising, in combination, an air-conditioning duct having air-moving means, said air-conditioning duct having an intake opening and an outlet opening exposed in said passenger compartment and means for circulating the air in said duct, whereby air can be re-circulated in a loop path passing through said duct and compartment, said air-conditioning duct including an electrostatic dust-precipitator comprising a plurality of alternately relatively insulated and uninsulated plate-electrodes paralleling the air flow through said duct, branch duct means for supplying fresh air to said duct at a point between said inlet and outlet openings, said branch duct means comprising a centrifugal mechanical air-cleaner of a type including a plurality of sets of nested tubes, said branch duct means having an intake outside of said compartment for delivering fresh atmospheric air to said mechanical air-cleaner for cleaning, a separate air moving means for forcing atmospheric air through said mechanical air-cleaner, and an open pipe for carrying dust away from said mechanical air-cleaner substantially as soon as the dust is removed from the fresh air passing through said mechanical air-cleaner to said air-conditioning duct.

7. An air-conditioning system in a railroad car having a passenger compartment, said system comprising, in combination, an air-conditioning duct having air-moving means, said air-conditioning duct having an intake opening and an outlet opening exposed in said passenger compartment whereby air can be recirculated in a loop path passing through said duct and compartment, said air-conditioning duct including an electrostatic dust-precipitator comprising alternately relatively insulated and uninsulated plate-electrodes paralleling the air flow through said duct, branch duct means having a discharge at a point in said loop-duct between said inlet and outlet openings, said branch duct means comprising a mechanical air cleaner of a type which includes means for causing dust to move out of the air stream flowing through the mechanical air-cleaner to the loop path, and means for carrying such separated dust away from the path for said air stream, said branch duct means having an intake out of said loop path for entry of fresh atmospheric air.

EDWARD H. R. PEGG.

REFERENCES CITED

The following references are of record in the file of this patent:

UNITED STATES PATENTS

| Number | Name | Date |
| --- | --- | --- |
| 2,203,503 | Nichols | June 4, 1940 |
| 2,176,841 | Hanson | Oct. 17, 1939 |
| 2,183,498 | Anderson | Dec. 12, 1939 |
| 1,997,125 | Soyez et al. | Apr. 9, 1935 |
| 2,360,355 | McBride et al. | Oct. 17, 1944 |
| 2,218,190 | Anderson | Oct. 15, 1940 |
| 426,359 | Bemis | Apr. 22, 1890 |
| 2,198,867 | Fair et al. | Apr. 30, 1940 |